Jan. 31, 1928.　　　　　R. E. WATTS　　　　　1,657,811
MOWING MACHINE
Filed March 19, 1925　　　3 Sheets-Sheet 1
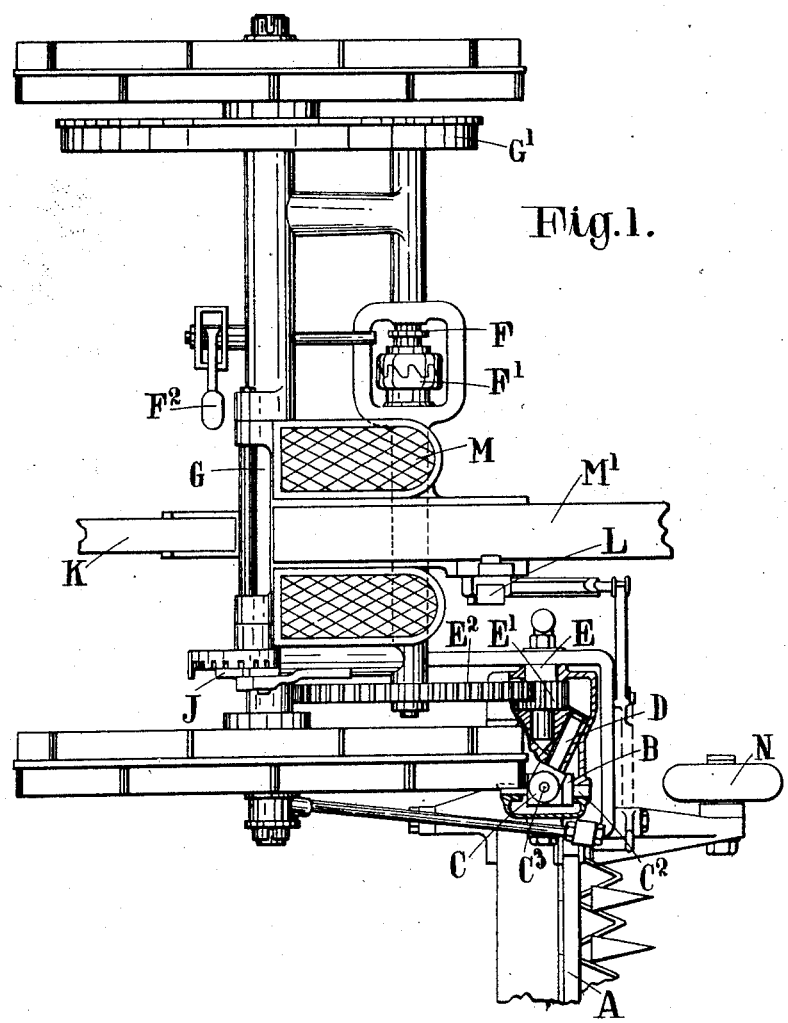

Jan. 31, 1928.　　　　　　　R. E. WATTS　　　　　　　1,657,811
MOWING MACHINE
Filed March 19, 1925　　　3 Sheets-Sheet 2
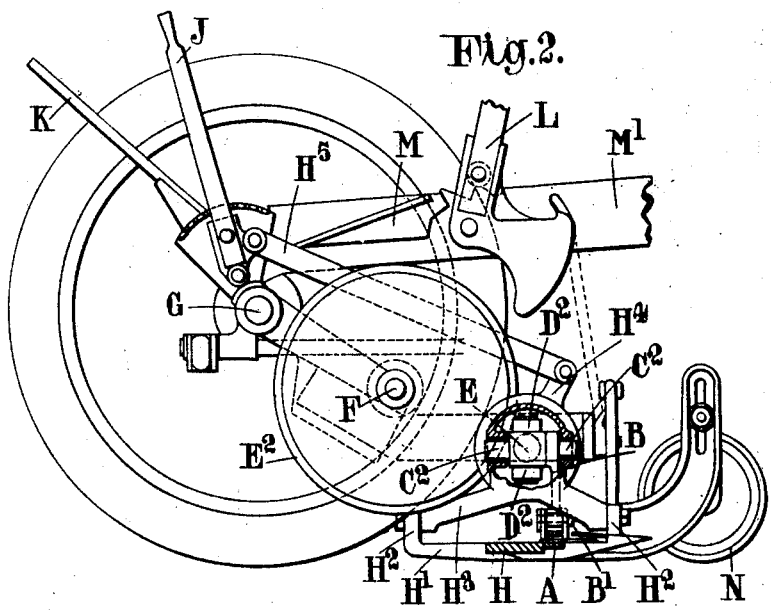
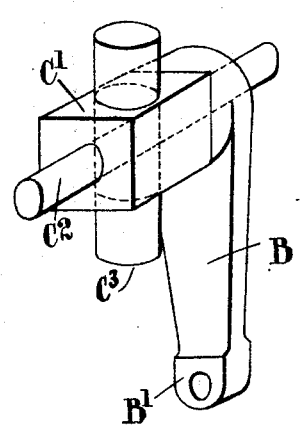
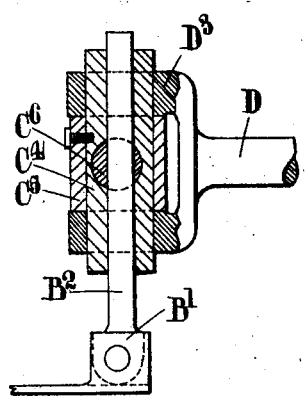
INVENTOR
R. E. Watts
BY
ATTORNEY Patented Jan. 31, 1928.

1,657,811

UNITED STATES PATENT OFFICE.

RICHARD EDWARD WATTS, OF STAMFORD, ENGLAND, ASSIGNOR OF ONE-HALF TO GEORGE MILLS BLACKSTONE, OF STAMFORD, ENGLAND.

MOWING MACHINE.

Application filed March 19, 1925, Serial No. 16,799, and in Great Britain December 23, 1924.

This invention relates to mowing machines of the kind employing a reciprocating knife and has for its object to provide an improved construction of machine in which the reciprocating movement of the knife is derived in an improved manner from the main axle of the machine. The term mowing machine is intended to cover, in addition to ordinary mowing machines, reaping machines and self-binding corn harvesters.

In the improved machine constructed in accordance with the present invention the knife is reciprocated by a crank arm driven through a universal joint mechanism from an inclined pin or crank, the axis about which the crank rotates coinciding with the axis about which the cutter bar is tilted for varying the height of the cut. This enables the axis of tilt to be arranged directly above the bar and avoids the necessity for a spherical joint connection between the crank arm and the knife which would otherwise be necessary to avoid straining the mechanism when the knife is tilted.

The crank arm is connected between the horizontal trunnions of a block provided with vertical trunnions to which the forked ends of the inclined pin or crank are pivoted.

In the accompanying drawings which illustrate one form of improved mowing machine embodying our invention, Fig. 1 represents a plan view partly in section of a mowing machine with certain parts omitted for the sake of clearness.

Fig. 2 represents an elevation thereof, partly in section.

Fig. 3 represents to enlarged scale the crank arm.

Fig. 4 represents a modified construction of mechanism for driving the crank arm from the inclined crank.

Figure 5:
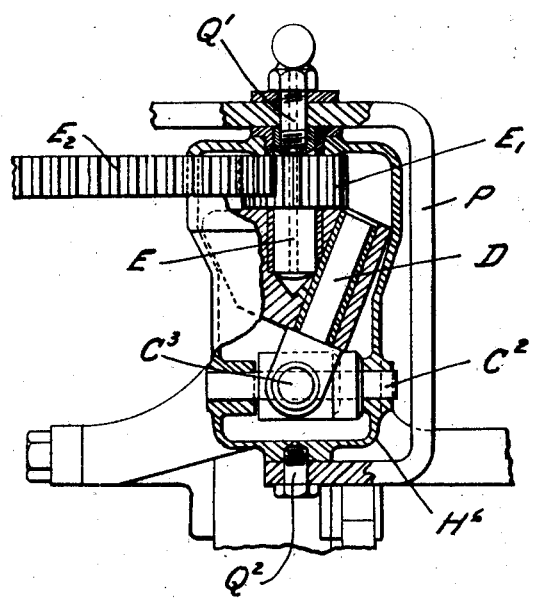
Fig. 5 is a view in section, partly in plan, showing on an enlarged scale the universal joint mechanism and casing therefor.

The knife A is reciprocated by a crank arm B which is oscillated through a universal joint mechanism C driven from an inclined pin D; this inclined pin is rotated about a stub shaft E and driven by a pinion $E^1$, and wheel $E^2$ from a shaft F which is parallel to the axle G of the machine.

The pinion $E'$ is provided with an extension having a bore inclined to the axis of the pinion in which bore the pin D is rotatably mounted, so that in the rotation of the pinion, the pin follows a circular path at an inclination to the axis of the pinion. The shaft F is driven from the axle through an internal toothed wheel $G^1$ and pinion with an intervening ratchet of the usual type and a ratchet dog-clutch $F^1$ operated by a tumbler lever $F^2$ is provided, thus allowing the blade mechanism to over-run the drive from the axle.

The universal-joint mechanism comprises a block $C^1$ which, in the form shown in Figs. 1, 3, and 5, is integral with or rigidly attached to the crank arm B; it is pivoted about the horizontal axis of journals $C^2$ projecting on each side of the block and fork arms $D^2$ carried by the inclined pin D bear upon vertical journals $C^3$ projecting from the block, and preferably passing through it. The crank arm is connected to the knife eye through a connection $B^1$.

The cutter bar H is carried by a frame $H^1$ which is hinged at $H^2$, $H^2$ to the yoke frame $H^3$ projecting from the box or casing $H^6$ in which the journals $C^2$ are mounted; this casing $H^6$ is pivoted about the axis of the stub shaft E and by means of an arm $H^4$, and connecting rod $H^5$ is connected to the tilting lever J which is arranged at the side of the seat-stem K. It will be seen that with the transmission mechanism described for reciprocating the knife this tilting operation, which is necessary to vary the height of the cutter above the ground, can be effected without straining the parts or necessitating a ball-joint connection between the knife bar A and crank arm B.

The casing $H^6$ is supported in a fixed frame P by means of screwed pins $Q^1$, $Q^2$ which pass through the frame into the casing and enable the latter to be tilted by means of the lever J. The pin $Q^1$ passes into the stub shaft E. By disconnecting the crank arm B from the knife A and removing the pins $Q^1$, $Q^2$ the casing H with its transmission gear can be removed and a spare-part can easily be fitted in the event of damage to the transmission gear.

A lifting lever L is pivoted to the pole plate M to which the draft pole $M^1$ is secured; this lifting lever causes the knife with its wheel N to be lifted right off the ground, the whole mechanism then pivoting about the main axle G.

In the modified construction illustrated in Fig. 4 the inclined pin D is integral with a forked member $D^3$ which pivots about a block $C^5$ provided with horizontal trunnions $C^6$. An arm $B^2$ passes freely through the bush $C^4$ in the block $C^5$ and is pivoted in the forked end $B^1$ of the knife A.

I claim:—

1. In a mowing machine, an inclined pin, means for driving said pin in a conical path, a universal joint mechanism connecting said pin with a crank arm, a knife reciprocated by said crank arm, a yoke frame carrying said knife, and means for tilting said frame about the axis of the conical path in which the inclined pin moves.

2. In a mowing machine, a knife, a yoke frame for said knife, means for tilting said frame about a horizontal axis, means to reciprocate said knife including a crank arm, a universal joint block connected to said crank arm, trunnions connected to said block pivoting about a horizontal axis, trunnions connected to said block pivoting about a vertical axis, a forked member pivoted to said last-mentioned trunnions, and means for causing said forked member to rotate in a conical path about the horizontal axis about which the yoke frame can tilt.

3. In a mowing machine, means for reciprocating the knife including a universal joint mechanism and an inclined pin rotating in a conical path, a driving pinion, a casing for housing said universal joint mechanism and driving pinion, and detachable means for securing said casing in the machine.

4. In a mowing machine, a gear wheel, means for driving said gear wheel by the movement of the machine, a pinion engaging said gear wheel, a pin driven by said gear wheel in a conical path, a reciprocating knife, universal joint mechanism connecting said pin with said knife, a casing housing said pinion and universal joint mechanism, a stub shaft upon which said pinion is freely mounted, means for supporting said stub shaft in the casing, and detachable means for securing said casing in the machine.

5. In a mowing machine, means for reciprocating the knife including a universal joint mechanism and inclined pin rotating in a conical path, a driving pinion, a casing for housing said universal joint mechanism and driving pinion, means for supporting said casing on pivots, and means for moving said frame upon its pivots while the knife is reciprocating.

6. In a machine of the kind set forth, a knife, means to reciprocate said knife including an oscillating crank arm; an inclined pin rotating about a horizontal axis; a universal joint connecting said crank arm and inclined pin; a pinion imparting rotary movement to said pin about an axis other than the axis of said pin; a wheel axle shaft; driving connections between said wheel axle shaft and said pinion; a cutter bar below and in close proximity to said pinion, and connections enabling said cutter bar to be rotated about an axis coincident with that of said pinion.

In testimony whereof I affix my signature.

RICHARD E. WATTS.